(12) United States Patent
Ozeki et al.

(10) Patent No.: US 8,562,055 B2
(45) Date of Patent: Oct. 22, 2013

(54) MACHINE TOOL

(75) Inventors: Tohru Ozeki, Obu (JP); Eiji Nakamura, Nagoya (JP); Kichiji Takeshita, Anjo (JP)

(73) Assignee: JTEKT Corporation, Osaka-shi (JP)

( * ) Notice: Subject to any disclaimer, the term of this patent is extended or adjusted under 35 U.S.C. 154(b) by 401 days.

(21) Appl. No.: 12/976,018

(22) Filed: Dec. 22, 2010

(65) Prior Publication Data

US 2011/0163488 A1 Jul. 7, 2011

(30) Foreign Application Priority Data

Jan. 5, 2010 (JP) ................................ 2010-000341

(51) Int. Cl.
*B23Q 3/00* (2006.01)
(52) U.S. Cl.
USPC ........................................ 296/25; 269/289 R
(58) Field of Classification Search
USPC ............... 269/25, 24, 27, 32, 20, 900, 289 R
See application file for complete search history.

(56) References Cited

U.S. PATENT DOCUMENTS

| | | | |
|---|---|---|---|
| 4,520,919 A | 6/1985 | Keitaro | |
| 6,439,559 B1 * | 8/2002 | Kinnard et al. | 269/21 |
| 6,655,671 B2 * | 12/2003 | Iwaki | 269/21 |
| 6,711,797 B1 * | 3/2004 | Bennett et al. | 29/281.6 |
| 7,210,675 B2 * | 5/2007 | Montague et al. | 269/20 |
| 2004/0113345 A1 * | 6/2004 | Montague et al. | 269/309 |
| 2005/0179188 A1 | 8/2005 | Sato | |
| 2011/0163488 A1 * | 7/2011 | Ozeki et al. | 269/25 |

FOREIGN PATENT DOCUMENTS

| | | |
|---|---|---|
| DE | 91 04 115.5 U1 | 7/1991 |
| FR | 2 510 017 A1 | 1/1983 |
| JP | 39 15 938 A1 | 11/1989 |

OTHER PUBLICATIONS

European Office Action issued Mar. 13, 2012 in patent application No. 10 197 352.7.
Extended European Search Report issued Apr. 14, 2011, in European Patent Application No. 10197352.7-2302.

* cited by examiner

*Primary Examiner* — Lee D Wilson
(74) *Attorney, Agent, or Firm* — Oblon, Spivak, McClelland, Maier & Neustadt, L.L.P.

(57) ABSTRACT

A machine tool includes: a hydraulic pump that supplies pressure oil; a fixture plate that positions a workpiece; a fixture base that detachably holds the fixture plate and that moves relative to a tool during machining; a hydraulic cylinder performs an attaching/removing operation for attaching or removing the fixture plate to or from the fixture base; an accumulator that accumulates the pressure oil from the hydraulic pump and that supplies the pressure oil to the hydraulic cylinder; and a manual valve that is manually switched to supply the pressure oil in the accumulator to the hydraulic cylinder to thereby control the attaching/removing operation of the hydraulic cylinder.

6 Claims, 3 Drawing Sheets

MACHINE TOOL

INCORPORATION BY REFERENCE/RELATED APPLICATION

This application claims priority to Japanese Patent Application No. 2010-000341 filed on Jan. 5, 2010 the disclosure of which, including the specification, drawings and abstract, is incorporated herein by reference in its entirety.

BACKGROUND OF THE INVENTION

1. Field of the Invention

The invention relates to a machine tool that includes a fixture that positions a workpiece using hydraulic pressure.

2. Discussion of Background

A machine tool machines a workpiece fixed to a table using a machining fixture. When workpieces having different shapes are machined by such a machine tool, a changeover of a fixture such as a work clamp is required due to changes of workpieces, which may take a long time. Then, Publication No. US2005/179188 describes a fixture in which a fixture plate having a work clamp is fastened by bolts to a fixture base fixed to a table. With the above configuration, a changeover of a fixture is simplified to reduce the time required to change workpieces.

However, when the fixture plate is fastened by bolts to the fixture base, the time to loosen a plurality of bolts, replace the fixture plates, and tighten the bolts again is required at the time of a changeover of the fixture. In addition, when work for fastening the bolts is manually performed, there is a concern about a decrease in machining accuracy, or the like, due to uneven tightening torque of each bolt.

In addition, when manual operation is required for a changeover of the fixture, usually, the machine tool is stopped for safety. Therefore, a power source such as a hydraulic pump cannot be used, and the fixture plate is fastened by bolts in the fixture as described above. Therefore, a long time may be required for a changeover of the fixture.

SUMMARY OF INVENTION

The invention is made in light of the above-described circumstances, and it is an object of the invention to provide a machine tool with which the time required for a changeover of a fixture due to changes of workpieces is reduced.

According to a feature of an example of the invention, a fixture is configured such that a fixture plate is attached to or removed from a fixture base by an attaching/removing operation of a hydraulic cylinder. The hydraulic cylinder is supplied with pressure oil from an accumulator that accumulates the pressure oil supplied from a hydraulic pump. Then, a manual valve supplies the pressure oil to the hydraulic cylinder to thereby control the attaching/removing operation of the hydraulic cylinder.

The fixture plate in which a positioning member such as a work clamp that fixes a workpiece is arranged in advance is attached to or removed from the fixture base. Therefore, it is possible to considerably reduce the time required for a changeover of the fixture. In addition, because the fixture plate is fixed to the fixture base by the attaching/removing operation of the hydraulic cylinder, in comparison with the case where the fixture plate is attached to or removed from the fixture base with the use of bolts, the time required for a changeover is reduced while reducing a work load for the changeover. Further, it is possible to more reliably fix the fixture plate to the fixture base.

In addition, the pressure oil accumulated in the accumulator is supplied to the hydraulic cylinder. Thus, even in a machine stopped state where the hydraulic pump is not in operation, the attaching/removing operation of the hydraulic cylinder can be controlled by the manual valve. That is, it is possible to switch the state between the state where the fixture plate is attached to the fixture base and the state where the fixture plate is removed from the fixture base by operating the manual valve. Furthermore, the valve for controlling the attaching/removing operation of the hydraulic cylinder is a manual switching valve. That is, in a changeover of the fixture, a worker is able to directly perform switching operation using the operating lever, or the like, of the manual valve.

According to another feature of an example of the invention, the accumulator and the manual valve are arranged in the fixture base. Then, these members are communicated with each other through an internal flow passage formed in the fixture base. The internal flow passage may extend from the accumulator via the manual valve to the hydraulic cylinder. Here, for example, in an external pipe provided outside the fixture base, pressure in the pipe may become high and the pipe may expand and deform. In this case, the volumetric capacity of the pipe increases and the pressure in the pipe decreases. Therefore, the pressure of pressure oil supplied to downstream of the valve decreases. In contrast, the internal flow passage of the fixture base is directly formed in the fixture base. Therefore, even when pressure in the flow passage becomes high at the time of supplying pressure oil, the cross-sectional shape of the flow passage remains almost unchanged. Thus, in comparison with the external pipe provided outside the fixture base, it is possible to more effectively prevent a decrease in pressure of pressure oil supplied to downstream of the valve.

According to a further feature of an example of the invention, in the attaching/removing operation performed by the hydraulic cylinder to attach or remove the fixture plate to or from the fixture base, the hydraulic cylinder is operated to achieve an unclamped state when the pressure oil is supplied to the hydraulic cylinder, and the hydraulic cylinder is operated to achieve a clamped state when the pressure oil is drained from the hydraulic cylinder. That is, in a changeover of the fixture, the hydraulic cylinder is supplied with the pressure oil when the fixture plate is removed from the fixture base. Thus, the pressure oil accumulated in the accumulator can be effectively used. In addition, in the clamped state during machining, the fixture plate can be reliably fixed using, for example, a built-in spring.

According to another feature of the invention, by way of example, in the attaching/removing operation of the hydraulic cylinder, the hydraulic cylinder is operated to achieve a clamped state when the pressure oil is supplied to the hydraulic cylinder, and the hydraulic cylinder is operated to achieve an unclamped state when the pressure oil is drained from the hydraulic cylinder. That is, in a changeover of the fixture, the hydraulic cylinder is supplied with the pressure oil when the fixture plate is attached to the fixture base. Thus, during machining, the fixture plate can be clamped to the fixture base with at least necessary minimum clamp force. Thus, the above configuration may be applied to various modes of the fixture to perform the attaching/removing operation for attaching or removing the fixture plate to or from the fixture base.

Further by way of example, according to another aspect of the invention, the machine tool is configured such that pump control means controls an operating state of the hydraulic pump based on a pressure accumulation state of the accumulator. The hydraulic cylinder of the fixture is supplied with the pressure oil from the accumulator. Therefore, the hydraulic cylinder is able to perform the attaching/removing operation even in a machine stopped state. In addition, when the pressure in the accumulator decreases due to the attaching/removing operation of the hydraulic cylinder for attaching or removing the fixture plate to or from the fixture base, detecting means detects the pressure accumulation state and then the pump control means is able to control the operating state of the hydraulic pump during operation of the machine so as to accumulate pressure oil in the accumulator to a predetermined pressure. Thus, it is possible to prepare for the next and following changeovers.

BRIEF DESCRIPTION OF DRAWINGS

The foregoing and further objects, features and advantages of this invention will become apparent from the following description of example embodiments with reference to the accompanying drawings, wherein like numerals are used to represent like elements and wherein.

DETAILED DESCRIPTION OF EMBODIMENTS

Figure 1:
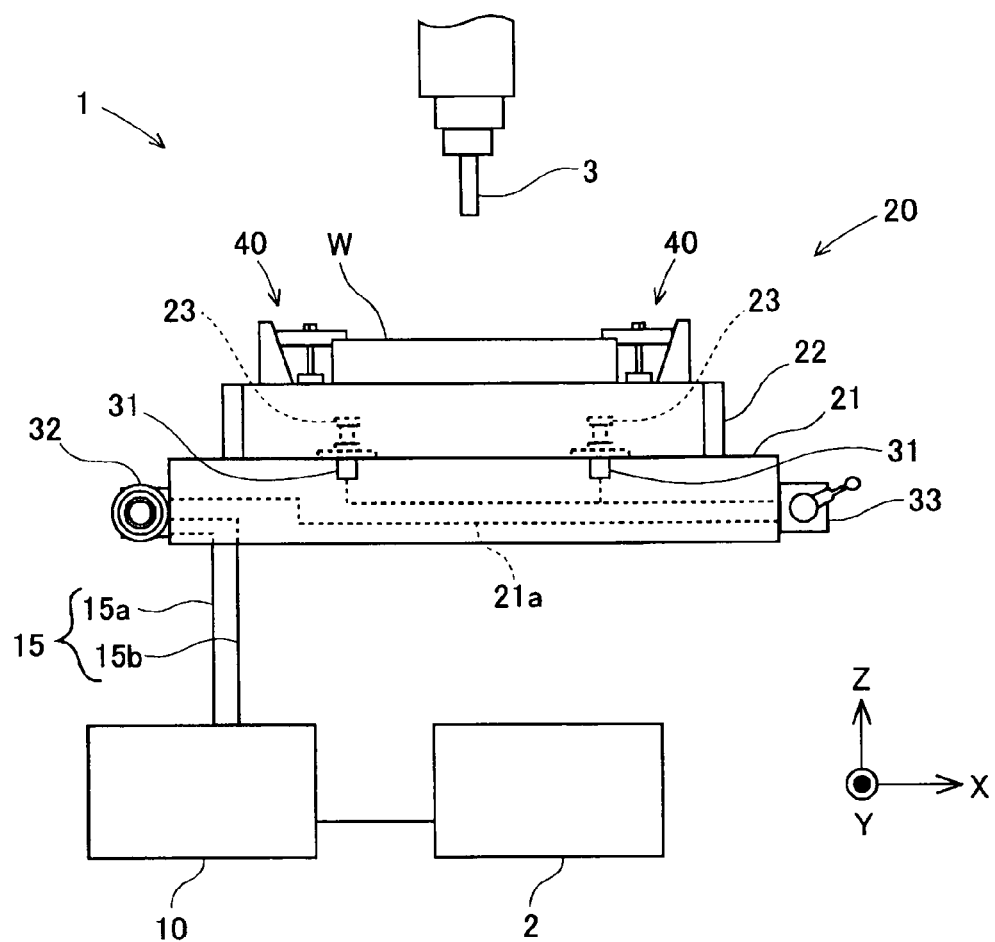
FIG. 1 is an overall view of a machine tool 1.

Hereinafter, embodiments of the invention will be described with reference to the accompanying drawings.

The configuration of a machine tool 1 will be described below. The machine tool 1 according to an embodiment will be described with reference to FIG. 1 to FIG. 3. The machine tool 1 includes a pump unit 10 and a fixture 20. The pump unit 10 supplies pressure oil. The fixture 20 includes a hydraulic unit 30 and work clamps 40. The work clamps 40 are used to position a workpiece W. The machine tool 1 relatively moves a tool 3 and the workpiece W positioned on a table based on a control signal from a numerical control device 2 to machine the workpiece W. The numerical control device 2 is mainly formed of a CPU and a memory. Then, the numerical control device 2 outputs a control signal for controlling drive shafts including a spindle and a feed shaft of the machine tool 1 based on received NC data.

Figure 3:
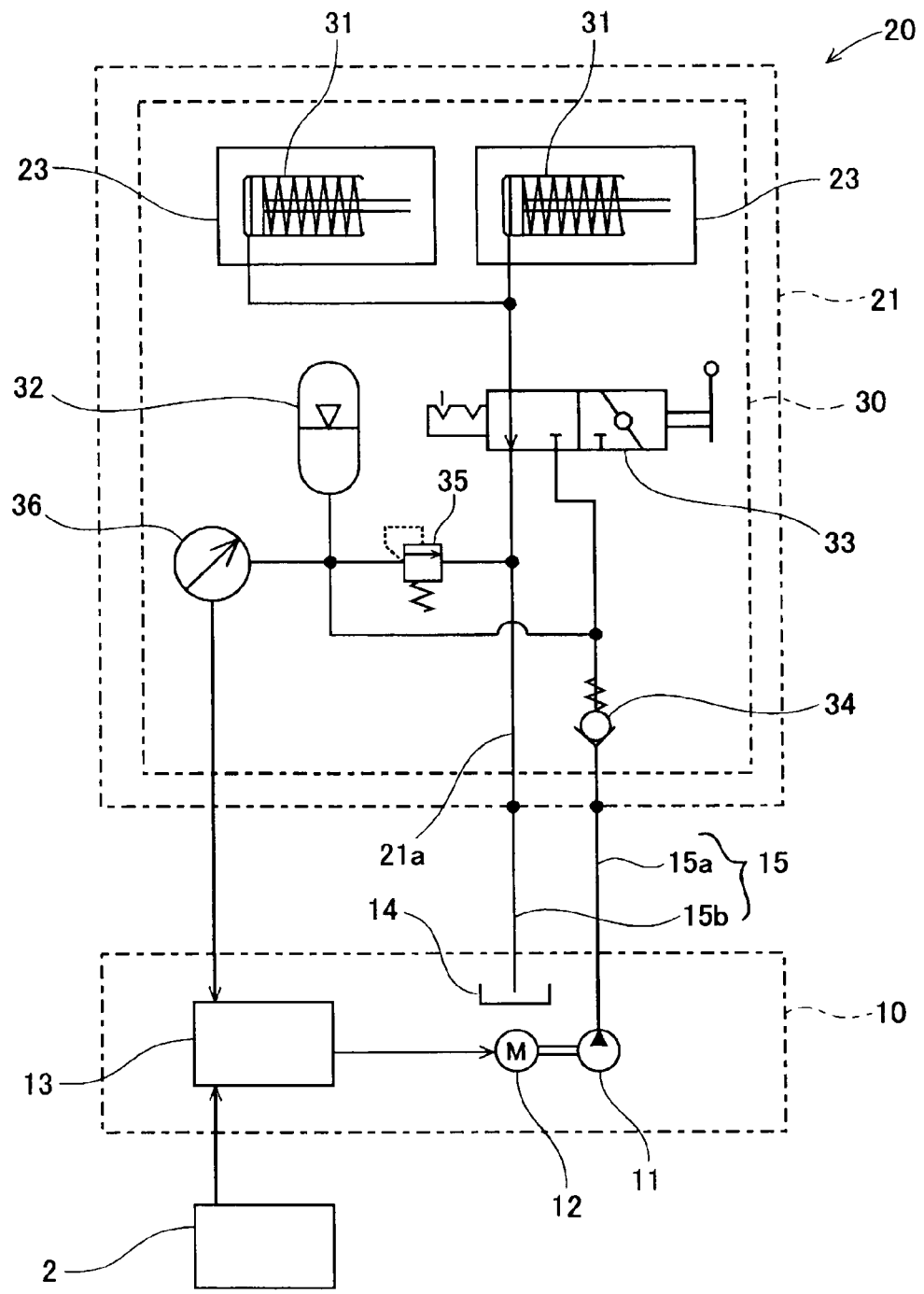
FIG. 3 is a hydraulic circuit diagram in a clamped state.

As shown in FIG. 1 and FIG. 3, the pump unit 10 includes a hydraulic pump 11, a motor 12, a drive circuit 13, a tank 14 and a supply pipe 15. The hydraulic pump 11 is a pump that supplies the pressure oil as the motor 12 is rotated. In addition, the rotational speed or the like of the motor 12 is controlled by the drive circuit 13. The drive circuit 13 controls a driving state such as the rotational speed of the motor 12 based on a control signal from the numerical control device 2, an output signal from a pressure gauge 36 (described later), or the like. The drive circuit 13 corresponds to "pump control means" according to the invention. In this way, the drive circuit 13 controls the motor 12 to control the operating state of the hydraulic pump 11.

In addition, the pump unit 10 stores the pressure oil in the tank 14 connected to the hydraulic pump 11. The supply pipe 15 has a feed oil pipe 15a and a drain oil pipe 15b. The supply pipe 15 connects the hydraulic pump 11 to a fixture base 21 of the fixture 20. The feed oil pipe 15a is connected to an oil feed-side connecting port of the fixture base 21, and supplies the pressure oil from the hydraulic pump 11 to the fixture base 21. The drain oil pipe 15b is connected to an oil drain-side connecting port of the fixture base 21, and returns the pressure oil, drained from the fixture base 21, to the tank 14.

The fixture 20 includes the fixture base 21, a fixture plate 22, reference seats 23, plate clamps 24, the hydraulic unit 30 and the work clamps 40. The fixture 20 uses the pressure oil supplied from the pump unit 10 to position the workpiece W with respect to the fixture base 21. The fixture base 21 is a reference base of the fixture 20. The reference base of the fixture 20 detachably holds the fixture plate 22, and is moved relative to the tool 3 by the feed shaft of the machine tool 1 during machining. The fixture base 21 is mounted on the table of the machine tool 1 directly or via a pallet. Then, the plate clamps 24 and the hydraulic unit 30 are arranged in the fixture base 21 as the components that constitute a mechanism for clamping the fixture plate 22.

Figure 2:
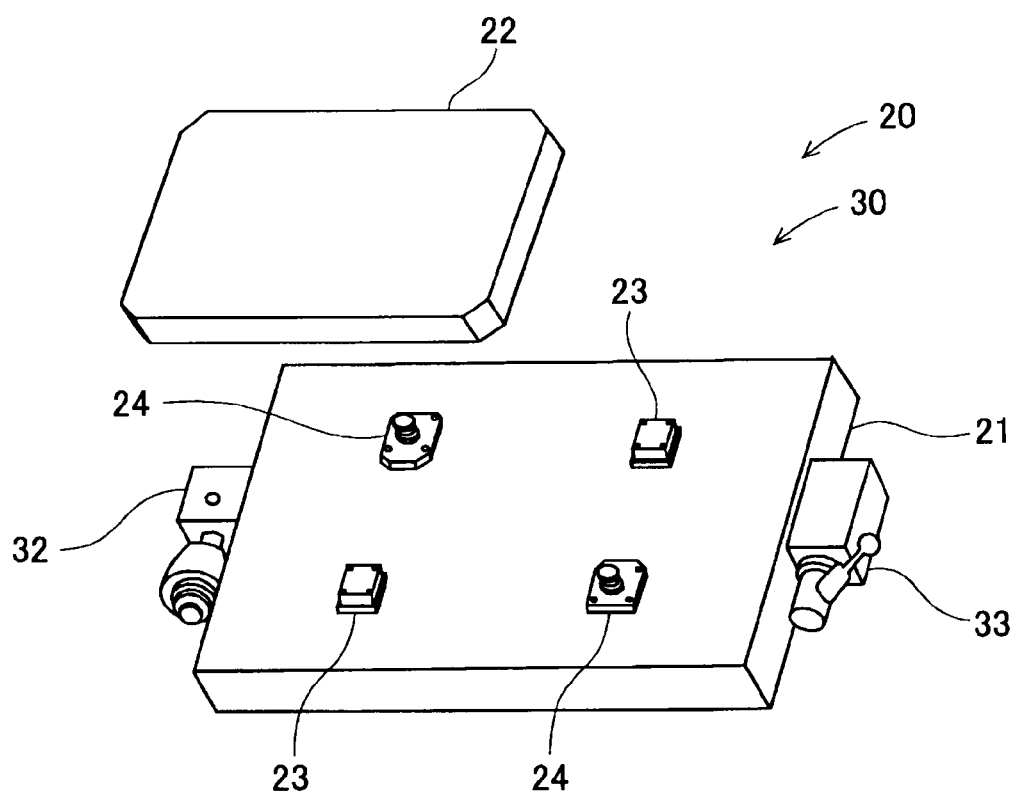
FIG. 2 is an overall view of a fixture 20.

The fixture plate 22 is a plate-like member that uses the work clamps 40 to support the workpiece W placed on the upper surface thereof. In addition, at the time of a so-called changeover in which the workpiece W is changed and the work clamps 40 are changed accordingly, the fixture plate 22 is removed from the fixture base 21 and replaced together with the work clamps 40. As shown in FIG. 2, the reference seats 23 are seat-like members that are provided at multiple portions on the upper surface of the fixture base 21. The reference seats 23 contact a reference plane provided on the lower surface of the fixture plate 22 when the fixture plate 22 is clamped on the fixture base 21. Thus, the fixture plate 22 is positioned in the Z-axis direction (up-down direction in FIG. 1) with respect to the fixture base 21.

The plate clamps 24 are a plurality of clamp members that are provided upright on the upper surface of the fixture base 21. The upper portion of each plate clamp 24 is inserted into a tubular portion provided at the lower surface of the fixture plate 22. Thus, the fixture plate 22 is positioned in the X-axis direction (lateral direction in FIG. 1) and the Y-axis direction (direction perpendicular to the sheet of FIG. 1) with respect to the fixture base 21 when the fixture plate 22 is clamped on the fixture base 21. Then, the plate clamps 24 clamp the fixture plate 22 to the fixture base 21, when the upper portions, inserted in the tubular portions provided at the lower surface of the fixture plate 22, are engaged with the fixture plate 22 and drawn by the hydraulic unit 30. As described above, the plate clamps 24 are members that indirectly position the workpiece W with respect to the fixture base 21.

As shown in FIG. 3, the hydraulic unit 30 is formed of hydraulic cylinders 31, an accumulator 32, a manual valve 33, a check valve 34, a relief valve 35 and a pressure gauge 36. These components are arranged in the fixture base 21. The hydraulic unit 30 uses the pressure oil supplied from the pump unit 10 to clamp/unclamp the fixture base 21 and the fixture plate 22 to/from each other with the use of the plate clamps 24.

Here, the fixture base 21 has an internal flow passage 21a through which pressure oil is allowed to flow. As described above, the fixture base 21 is connected to the hydraulic pump 11 by the supply pipe 15, and is supplied with pressure oil. Then, the internal flow passage 21a connects the hydraulic cylinders 31, the accumulator 32 and the manual valve 33, which are arranged in the fixture base 21, to each other. Specifically, the supply side of the internal flow passage 21a connects the connecting port of the fixture base 21, connected to the feed oil pipe 15a of the supply pipe 15, to the hydraulic cylinders 31 via the accumulator 32 and the manual valve 33. The oil drain side of the internal flow passage 21a connects the hydraulic cylinders 31 to the connecting port of the fixture base 21, connected to the drain oil pipe 15b of the supply pipe 15, via the manual valve 33.

The plurality of hydraulic cylinders 31 are embedded in the fixture base 21. The pressure oil can be supplied to or drained from each of the hydraulic cylinders 31 through the internal flow passage 21a of the fixture base 21. Each of the hydraulic cylinders 31 is a single-acting cylinder in which a piston (not shown) is moved upward against the elastic force of a built-in spring when pressure oil is supplied and that the piston is moved downward by the elastic force of the spring when pressure oil is drained. In addition, the pistons of the plurality of hydraulic cylinders 31 are respectively connected to the plurality of plate clamps 24 arranged on the fixture base 21.

Thus, the plate clamps 24 clamp the fixture plate 22 when the pressure oil is drained from the hydraulic cylinders 31 and then the pistons are moved downward by the elastic forces of the respective springs. In addition, the plate clamps 24 push up the fixture plate 22 to unclamp the fixture plate 22 when the pressure oil is supplied to the hydraulic cylinders 31 and then the pistons are moved upward. In this way, the plate clamps 24 clamp/unclamp the fixture plate 22 by the operation of the hydraulic cylinders 31 to thereby indirectly position the workpiece W with respect to the fixture base 21.

The accumulator 32 is a pressure accumulator that accumulates the pressure oil from the hydraulic pump 11. The accumulator 32 is connected to the hydraulic cylinders 31 via the supply side of the internal flow passage 21a of the fixture base 21. Thus, the accumulator 32 is able to supply the pressure oil that moves the pistons of the hydraulic cylinders 31 upward even when the hydraulic pump 11 is stopped.

The manual valve 33 is a manually switchable manual switching valve that is arranged in the internal flow passage 21a of the fixture base 21 in a hydraulic circuit. That is, the manual valve 33 is able to switch between supply and drain of the pressure oil to and from the hydraulic cylinders 31 when a worker manually operates an operating lever. When the pressure oil in the accumulator 32 is supplied to the hydraulic cylinders 31 by the manual valve 33, the pistons of the hydraulic cylinders 31 are moved upward and then the fixture plate 22 is unclamped. On the other hand, when the pressure oil in the hydraulic cylinders 31 is drained by the manual valve 33, the pistons of the hydraulic cylinders 31 are moved downward by the elastic forces of the springs and then the fixture plate 22 is clamped. In this way, the manual valve 33 is used to control the attaching/removing operation of the hydraulic cylinders 31 by manually operating the operating lever.

As shown in FIG. 3, the check valve 34 is provided between the connecting port of the fixture base 21, connected to the feed oil pipe 15a of the supply pipe 15, and the accumulator 32 in the hydraulic circuit. The check valve 34 is set such that the pressure oil freely flows from the pump unit 10-side to the hydraulic cylinders 31-side and accumulator 32-side. In addition, when the hydraulic pump 11 is stopped and then supply of the pressure oil is stopped, the check valve 34 limits flow of the pressure oil so that the pressure oil accumulated in the accumulator 32 does not flow back through the feed oil pipe 15a.

The relief valve 35 is provided between the accumulator 32 and the connecting port of the fixture base 21, connected to the drain oil pipe 15b of the supply pipe 15. The relief valve 35 drains the pressure oil when the pressure in the internal flow passage 21a of the fixture base 21 is higher than or equal to a predetermined pressure. This prevents the pressure in the hydraulic circuit from becoming abnormally high to thereby protect members and flow passage in the hydraulic circuit.

The pressure gauge 36 is a sensor that is provided between the accumulator 32 and the manual valve 33, and that detects the pressure of pressure oil in the internal flow passage 21a of the fixture base 21. The pressure gauge 36 detects the pressure accumulation state of the accumulator 32, and corresponds to "detecting means" according to the invention. In addition, the pressure gauge 36 outputs a signal, corresponding to the detected pressure, to the drive circuit 13 of the pump unit 10. Thus, the pump unit 10 in operating state determines whether the accumulator 32 of the hydraulic unit 30 needs to be supplied with the pressure oil. In addition, the drive circuit 13 of the pump unit 10 is able to execute controls such as a control for reducing the rotational speed of the hydraulic pump 11 or a control for switching the state of the hydraulic pump 11 to a rest state, based on the output signal from the pressure gauge 36.

As described above, in the fixture 20, the hydraulic unit 30 is operated to clamp the fixture plate 22 with the use of the plate clamps 24. Thus, the fixture 20 positions the workpiece W with respect to the fixture base 21. In addition, the accumulator 32 and the manual valve 33 that are provided in the fixture base 21 are communicated with each other through the internal flow passage 21a formed inside the fixture base 21. The work clamps 40 are known clamp devices that fixedly position the workpiece W with respect to the fixture plate 22.

Advantageous effects of the machine tool 1 will be described below. With the above-described machine tool 1, the fixture 20 is configured such that the fixture plate 22 is attached to or removed from the fixture base 21 by the attaching/removing operation of the hydraulic cylinders 31. Thus, in comparison with the case where the fixture plate 22 is attached to or removed from the fixture base 21 with the use of bolts, it is possible to considerably reduce the time required for a changeover that requires replacement of the fixture.

In addition, the hydraulic cylinders 31 are supplied with the pressure oil accumulated in the accumulator 32. Thus, in a machine stopped state where the hydraulic pump 11 is not in operation, the hydraulic cylinders 31 can be operated by being supplied with the pressure oil required to unclamp the fixture plate 22, from the accumulator 32. That is, the manual valve 33 is used to control the attaching/removing operation for attaching or removing the fixture plate 22 to or from the fixture base 21 in the fixture 20, and it is possible to perform the operation for clamping/unclamping in the fixture 20 even in the machine stopped state.

Furthermore, the valve used to control the attaching/removing operation of the hydraulic cylinder 31 in the fixture 20 is the manually switchable manual valve 33. That is, in a changeover of the fixture 20, a worker is able to directly perform switching operation using the operating lever of the manual valve 33.

Each of the accumulator 32 and the manual valve 33 is arranged in the fixture base 21 of the fixture 20. Then, the accumulator 32 and the manual valve 33 are communicated with each other through the internal flow passage 21a formed in the fixture base 21. Here, for example, in an external pipe provided outside the fixture base 21, pressure in the pipe becomes high and the pipe may expand and deform. In this case, the volumetric capacity of the pipe increases and therefore the pressure in the pipe decreases. Accordingly, the pressure of pressure oil supplied to the hydraulic cylinders 31 decreases.

In contrast, the internal flow passage 21a is directly formed in the fixture base 21. Therefore, even when the pressure in the flow passage becomes high at the time of supplying the pressure oil, the cross-sectional shape of the flow passage remains almost unchanged. Thus, in comparison with the external pipe provided outside the fixture base 21, it is possible to more effectively prevent a decrease in pressure of the pressure oil supplied to the hydraulic cylinders 31 located downstream of the manual valve 33.

The fixture 20 clamps the fixture plate 22, supporting the workpiece W, to the fixture base 21 to thereby indirectly position the workpiece W with respect to the fixture base 21.

The fixture 20 clamps or unclamps the fixture plate 22 by the attaching/removing operation of the hydraulic cylinder 31. In this way, the hydraulic unit 30 that includes the hydraulic cylinders 31 that are operated by the pressure oil accumulated in the accumulator 32 is applied to the fixture 20. Thus, even in the machine stopped state, the fixture 20 can be operated by the manual valve 33.

In addition, in the attaching/removing operation of the hydraulic cylinder 31, the unclamped state is achieved when the pressure oil is supplied to the hydraulic cylinders 31, and the clamped state is achieved when the pressure oil is drained from the hydraulic cylinders 31. Thus, the pressure oil accumulated in the accumulator 32 can be effectively used. In addition, in the clamped state during machining, the fixture plate 22 can be reliably fixed using the elastic forces of the built-in springs.

The machine tool 1 is configured such that the drive circuit 13 that is the pump control means controls the operating state of the hydraulic pump 11 based on the pressure accumulation state of the accumulator 32. The hydraulic cylinders 31 of the fixture 20 are supplied with pressure oil from the accumulator 32. Therefore, the hydraulic cylinders 31 are able to perform the attaching/removing operation even in the machine stopped state. In addition, when the pressure in the accumulator 32 decreases due to the attaching/removing operation of the hydraulic cylinders 31, the pressure gauge 36 detects the pressure accumulation state and then the drive circuit 13 is able to control the operating state of the hydraulic pump 11 during operation of the machine so as to accumulate the pressure oil in the accumulator 32 to a predetermined pressure. Thus, it is possible to prepare for the attaching/removing operation of the hydraulic cylinders 31 in the next and following changeovers.

An alternative embodiment will be described below. In the above-described embodiment, in the attaching/removing operation of the hydraulic cylinders 31, the unclamped state is achieved when the pressure oil is supplied to the hydraulic cylinders 31, and the clamped state is achieved when the pressure oil is drained from the hydraulic cylinders 31. However, in the attaching/removing operation of the hydraulic cylinders 31, the clamped state where the fixture plate 22 is attached to the fixture base 21 is achieved when the pressure oil is supplied to the hydraulic cylinders 31, and the unclamped state where the fixture plate 22 is removed from the fixture base 21 is achieved when the pressure oil is drained from the hydraulic cylinders 31.

With the above configuration, for example, in the hydraulic cylinders 31 that are single-acting cylinders, the pistons are moved downward against the elastic forces of the built-in springs when pressure oil is supplied, and the pistons are moved upward by the elastic forces of the springs when pressure oil is drained. In this way, in a changeover of the fixture 20, the hydraulic cylinders 31 are supplied with pressure oil when the fixture plate 22 is attached to the fixture base 21. Thus, during machining, the fixture plate can be clamped to the fixture base with at least necessary minimum clamp force. Thus, the above configuration may be applied to various modes of the fixture to perform the attaching/removing operation for attaching or removing the fixture plate to or from the fixture base.

Here, in this embodiment, in the attaching/removing operation of the hydraulic cylinders 31, the time during which the clamped state is maintained during machining is longer than the time during which the unclamped state is maintained during changeover. That is, in this embodiment, the hydraulic cylinders 31 are supplied with the pressure oil accumulated in the accumulator 33 for a long period of time. Thus, in consideration of the time during which the pressure oil is supplied, preferably, the pressure oil accumulated in the accumulator 33 is supplied to the hydraulic cylinders 31 during a changeover to maintain the unclamped state, and the clamped state is maintained by the elastic forces of the springs during machining that takes a long period of time.

What is claimed is:

1. A machine tool comprising:
   a hydraulic pump that supplies pressure oil;
   a fixture plate that positions a workpiece;
   a fixture base that detachably holds the fixture plate, and that moves relative to a tool during machining;
   a hydraulic cylinder that performs an attaching/removing operation for attaching or removing the fixture plate to or from the fixture base;
   an accumulator that accumulates the pressure oil from the hydraulic pump, and that supplies the pressure oil to the hydraulic cylinder; and
   a manual valve that is manually switched to supply the pressure oil in the accumulator to the hydraulic cylinder to thereby control the attaching/removing operation of the hydraulic cylinder, wherein
   the accumulator and the manual valve are arranged in the fixture base, and are communicated with each other through an internal flow passage formed inside the fixture base.

2. The machine tool according to claim 1, wherein
   in the attaching/removing operation of the hydraulic cylinder, the hydraulic cylinder is operated to achieve an unclamped state where the fixture plate is removed from the fixture base when the pressure oil is supplied to the hydraulic cylinder, and the hydraulic cylinder is operated to achieve a clamped state where the fixture plate is attached to the fixture base when the pressure oil is drained from the hydraulic cylinder.

3. The machine tool according to claim 1, wherein
   in the attaching/removing operation of the hydraulic cylinder, the hydraulic cylinder is operated to achieve a clamped state where the fixture plate is attached to the fixture base when the pressure oil is supplied to the hydraulic cylinder, and the hydraulic cylinder is operated to achieve an unclamped state where the fixture plate is removed from the fixture base when the pressure oil is drained from the hydraulic cylinder.

4. The machine tool according to claim 1, further comprising:
   a pressure detector which detects a pressure accumulation state of the accumulator; and
   a controller which controls an operating state of the hydraulic pump based on the pressure accumulation state detected by the pressure detector.

5. The machine tool according to claim 1, further comprising:
   at least one reference seat provided on an upper surface of the fixture base, the reference seat contacting a reference plane provided on a lower surface of the fixture plate when the fixture plate is attached to the fixture base.

6. The machine tool according to claim 1, further comprising:
   at least one plate clamp provided on an upper surface of the fixture base, an upper portion of the plate clamp being inserted into a tubular portion provided at a lower surface of the fixture plate, and the plate clamp clamps the fixture plate to the fixture base when the upper portion of the plate clamp is engaged with the fixture plate and drawn by the hydraulic cylinder.

* * * * *